March 17, 1953  A. L. STONE  2,631,871
PRESSURE RESPONSIVE PIPE JOINT SEAL
Filed April 30, 1949
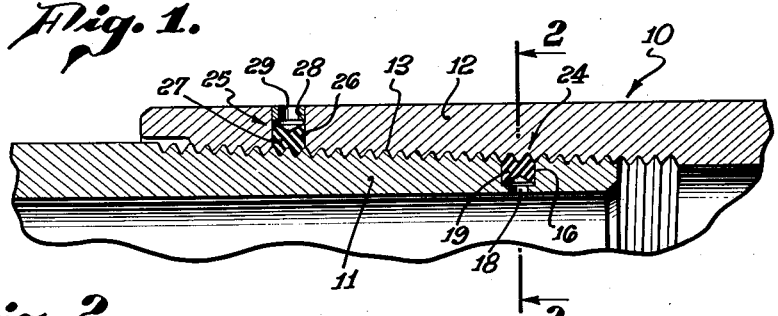
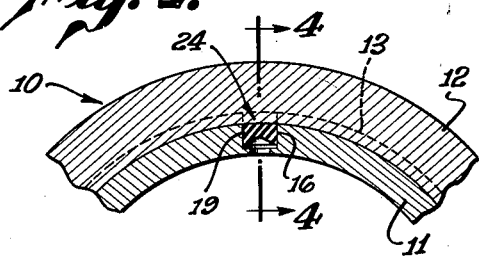
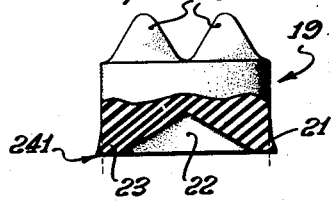
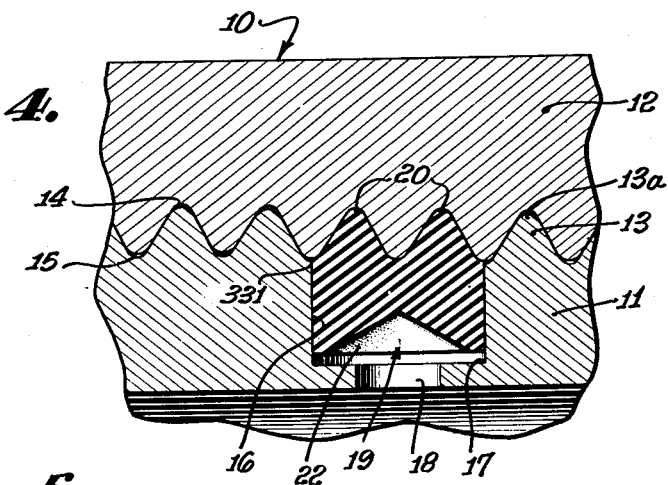
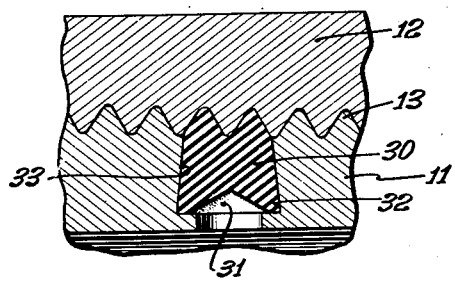
ALBERT L. STONE,
INVENTOR.
BY
ATTORNEY.

Patented Mar. 17, 1953

2,631,871

UNITED STATES PATENT OFFICE 2,631,871

PRESSURE RESPONSIVE PIPE JOINT SEAL

Albert L. Stone, Palos Verdes Estates, Calif.

Application April 30, 1949, Serial No. 90,678

3 Claims. (Cl. 285—146)

This invention relates to improved sealing means for preventing fluid leakages through thread clearances in threaded pipe joints, the invention being applicable to the sealing of threaded pipe joints generally and having particular, though typical, utility for sealing the joints in well pipe such as casing, tubing, drill pipe and the like. In its more specific aspects, the present invention is directed to improvements in the types and forms of seals disclosed in my copending application Serial Number 630,196, filed November 23, 1945, on Pipe Joint Seal, and of which the present application is a continuation-in-part.

The present type of seal may be characterized as useable in a joint comprising inner and outer sections having interengaging threads with small clearance spaces therebetween, and comprising a body of deformable material contained within an opening or recess occupying a portion only of the annular thread area of one of the sections and tightly pressed against the opposing thread or threads of the opposing section to form across the clearance space a dam which effectively seals the joint against fluid leakage through the space. As indicated, the dam element is made of a material deformable in tight and sealing conformance with the thread shapes against which it is pressed, such material preferably being non-metallic and having elastic or shape-restoring qualities, particularly where it is intended that the same dam element may have repeated uses and continued sealing effectiveness in a joint that may be repeatedly broken and made-up. Preferred materials are the natural or synthetic rubbers, and the organic or resinous plastic compositions characterized by their deformability and tendency for substantial shape restoration.

One of my primary objects is to improve upon the sealing dam in respects rendering it most effectively responsive to an applied fluid pressure, in assuring the maintenance of a perfect inter-thread seal. In this respect the invention contemplates the insertion in a transverse opening in one of the joint sections, of a dam element which is bodily movable within the opening as it is pressed against the threads, and which has a sealing relation with the wall of the opening so that element assumes the full pressure of a fluid (e. g., inside the joint) tending to force the element in a sealing direction, while preventing leakage of such fluid around or past the element. In accordance with the invention, the element is provided with a sealing lip engaging the opening wall and formed as by recessing or cavitating the end of the element. Preferably the lip, however formed, is given a normal or preformed diameter larger than the opening, so that when inserted therein, the lip lies in snug sealing engagement against the wall of the opening.

For many purposes it is preferred to subject the dam element to the fluid pressure under the joint, and to cause the element to be forced outwardly against the threads of the outer section. In such instances the inner joint section may have an opening drilled through its threaded wall to contain the dam insert, so that the pressure tending to create fluid leakage through the thread clearance will at the same time force the dam into tightly sealed condition across the space.

The various features and objects of the invention, as well as the details of certain illustrative embodiments, will be explained more fully and to better advantage in the following detailed description of the illustrative embodiment shown by the accompanying drawing, in which:

Fig. 1 is a sectional view showing a joint structure containing the thread seals;

Fig. 2 is a fragmentary cross section on line 2—2 of Fig. 1;

Fig. 3 is a view, partly in section, of the sealing plug itself;

Fig. 4 is an enlarged section on line 4—4 of Fig. 2; and

Fig. 5 is a view similar to Fig. 4, illustrating a variational form of the invention.

As illustrative of a threaded joint structure adapted to be sealed against fluid leakage in accordance with the invention, I have shown in Fig. 1 an oil well casing joint structure generally indicated at 10, comprising an externally threaded pin section 11 screwed into the internally threaded box section 12. It will be understood that the spiral or helical threads 13 may have any of various specific cross sectional shapes, although I may cite as typical the standard or conventional essentially V-thread, the crest 13a of which (as well as the base 14 of the opposing inter-thread recess) may be beveled or rounded as and for the purposes known to those familiar with the art. The particular consideration of importance here is that spiral clearance spaces may exist or develop at 15 between the thread crest and opposing recess spaces, which, particularly where relatively high pressure differentials may exist between the inside and outside of the joint, can initiate through the thread clearance fluid leakage which in the course of time may results in erosion and leakage increase to serious proportions.

The invention contemplates positively sealing the joint against fluid leakage either outwardly or inwardly through the thread clearance, by inserting within either one or both of the joint sections 11 and 12 a sealing element engageable in each instance against opposing threads of the other section, to tightly seal off fluid leakage through the clearance space 15. Particularly contemplated is the use of a sealing or dam element made preferably of an essentially non-metallic material having the properties of deformability in response to applied pressure, and of sufficient resiliency or elasticity, as to have at least substantial shape-restoring tendencies. Further and also particularly contemplated is the maintenance of the sealing element in a location and condition such that it is tightly urged in sealing condition by the fluid pressure tending to create any leakage through the joint.

Referring to Figs. 2 and 4, the inner pin section 11 of the joint is drilled at a location preferably near its inner end, to form a counterbore 16 intersecting typically a pair of the inner section threads 13 and occupying a small fraction of the total circular extent of the threads so that the joint strength is not appreciably affected. The counterbore 16 terminates at shoulder 17 containing the smaller diameter bore or opening 18. As illustrated, the counterbore contains a sealing element 19 which may have essentially the form of a circular cross section plug formed for example of rubber. The thread engaging end of the plug is shown to have a pair of reduced projections 20 receivable between successive threads of the box section 12, it being found that the projections are highly effective in maintaining fluid tight seals against the threads when shaped and proportioned substantially in accordance with segments of the threads themselves.

Referring to Fig. 3, the sealing element 19 is preformed to present at its end opposite the projections 20, an annular lip 21 responsive to fluid pressure within the joint in a manner causing the lip to be pressed into fluid tight engagement with the wall of bore 16. Preferably such lip formation is given the inner end of the seal by cavitating the body 19 at 22 to a depth such that its thickness at 23 is reduced to a degree forming a pressure responsive lip. The sealing effectiveness of the insert is further enhanced by preforming the lip 23 with a diameter, as indicated at 241, greater than the diameter of the bore 16, so that the lip is constantly pressed by virtue of the resiliency of the elastic material, against the bore wall. As will be apparent, shoulder 17 and the opening 18 together prevent loss of the sealing insert out of its opening when the joint is made up, while permitting direct communication of fluid pressure to its lipped end.

Instead of or in addition to placement of the sealing dam at the location 24 within the joint pin section 11, the seal may be maintained at 25 and accommodated within the box section 12, by counterboring the latter from the inside at 26 for reception of the previously described sealing element 27 at the inside of retaining shoulder 28 and opening 29 through which pressure outside the joint may be communicated to the seal.

The form of the invention illustrated in Fig. 5 is similar to the described embodiment in employing a sealing element 30 having about the cavitation 31 pressure expansible lip 32. Here however the plug is assumed to be received within a tapered bore 33 against which the plug engages with fluid sealing tightness as pressure tends to displace the plug toward the threads. The plug may be preformed to have an outer surface taper corresponding substantially to the angularity of the bore 33.

In making up the joint assembly 10, the threads 13 may be left uncoated or "dry," or they may be coated with a suitable sealing compound or lubricant, the function of which may be either or both to lubricate engagement and disengagement of the threads and to fill the clearance spaces 14 with a plastic or flowable compound tending to prevent fluid leakage therethrough. Such lubricants or sealing compounds are of course well known and in common use. As the joint sections are screwed together, the sealing elements 19 or 27 tend to wipe or crowd the sealing compound forwardly along the threads toward the inner pin end of the joint, thus ultimately placing the compound in a condition such that it is interposed between the inner end of the clearance space 14 and the sealing element. Thus fluid leakage from within the joint is resisted not only by reason of the presence of the sealing compound in the clearance space, but also because the sealing element imposes a positive barrier against pressure displacement of the sealing compound or lubricant. The effect of fluid pressure application to the lipped end of the sealing element, is to crowd the projections 20 in full tight sealing engagement with the opposed thread surfaces, and of course the higher the pressure tending to create leakage through the joint, the tighter will be the seal effected in response to that pressure. Particularly where extremely high pressures are encountered, the plug material may tend to flow into any exposed clearances, as for example at 331. However, notwithstanding deformation to which the plug is subjected under sealing conditions, it restores from that deformation when the joint is broken, and consequently is capable of repeated useages.

I claim:

1. A tubular joint comprising inner and outer sections having interengaging threads and spiral fluid-containing space between the threads, a body of deformable material contained within a recess occupying a portion only of the annular extent of the threads of one of the sections and having an end engaging the threads of the other section to form a dam across said space to seal the joint against fluid leakage therethrough, said body being unattached to the wall of said recess and being bodily movable therein, said end of the body having a pair of preformed projections receivable between and in sealing engagement with adjacent threads on said other section, and means communicating to said body the fluid pressure inside said sections to force the body against said other section threads.

2. A tubular joint comprising inner and outer sections having interengaging threads and spiral fluid-containing space between the threads, a dam of deformable material contained within an opening in the inner section occupying only a portion of the annular extent of the threads thereof and engaging the threads of the outer section to form a fluid-tight seal across said space, said dam being composed essentially of rubber and being unattached to the wall of said opening so that the dam is bodily movable therein, said end of the body having a pair of projections receivable between and preformed substantially in accordance with segments of adjacent threads on said outer section the fluid pressure inside said sections being communicated to said dam to force it against the outer section threads.

3. A tubular joint comprising inner and outer sections having interengaging threads and spiral fluid-containing space between the threads, a body of deformable material contained within a recess occupying a portion only of the annular extent of the threads of one of the sections and having an end engaging the threads of the other section to form a dam across said space to seal the joint against fluid leakage therethrough, said body being unattached to the wall of said recess and being bodily movable therein, said end of the body having a pair of preformed projections receivable between and in sealing engagement with adjacent threads on said other section, said body being composed of material having elastic qualities giving to the body shape restoring characteristics, and means communicating to said body the fluid pressure inside said sections to force the body against said other section threads.

ALBERT L. STONE.

REFERENCES CITED

The following references are of record in the file of this patent:

UNITED STATES PATENTS

| Number | Name | Date |
|---|---|---|
| 497,990 | Simrell | May 23, 1893 |
| 631,661 | Perry | Aug. 22, 1899 |
| 913,144 | James et al. | Feb. 23, 1909 |
| 1,213,492 | Hughes | Jan. 23, 1913 |
| 1,918,443 | Baash | July 18, 1933 |
| 2,087,185 | Dillon | July 13, 1937 |
| 2,380,690 | Graham | July 31, 1945 |
| 2,474,556 | Stone | June 28, 1949 |
| 2,499,104 | Lovell | Feb. 28, 1950 |
| 2,559,806 | Thompson | July 10, 1951 |